STEPHEN N. MC KNIGHT
ALICE B. MC KNIGHT
*INVENTORS*

ATTORNEYS 3,390,478
FISHING LURE
Stephen N. McKnight and Alice B. McKnight, both of
P.O. Box 85, Junction City, Calif. 96048
Filed Dec. 8, 1965, Ser. No. 512,437
4 Claims. (Cl. 43—17.6)

ABSTRACT OF THE DISCLOSURE

A fish lure having a wrinkled, arcuate body simulating a larva, with a helical fin near its forward end occupying a part circle. A swivel is located in the front end of the lure to permit rotation of the lure, and a second swivel is located opposite the fin at the concave side of the body to which is attached a hook capable of extending to the tail end of the body.

---

The objects of this invention are:

First, to provide a fishing lure which, while simulating a larva, is provided with a helical fin and a curved body so that the lure tends to rotate; however, on rotation, the curved body creates and produces lateral forces to cause the lure to have some random or irregular movement, thus simulating the natural movement of a live larva or possibly an injured one.

Second, to provide a fishing lure of this type wherein the hooks are attached in the region of the helical fin at the concave side of the body, and are so spaced from their point of attachment as to occupy a position adjacent the tail-end of the body, as well as being swivelly mounted for rotation independently of the body.

Third, to provide a fishing lure which is adapted to be made of a light-weight plastic material which may be impregnated with a fluorescent material so as to be readily visible in the water.

With the above and other objects in view as may appear hereinafter, reference is directed to the accompanying drawings, in which.

The fishing lure comprises a body 1 which is essentially arcuate in contour and is approximately circular in cross section.

Beginning at a point near the forward end of the body and extending axially about one-third the length of the body is a helical fin 2. Viewed end-wise, the fin occupies approximately two-thirds the circumference of the body. As viewed in FIGURES 1 and 2, the major portion of the helical fin is located above the body and the body curved downwardly and rearwardly from the fin.

The body is provided with a series of ridges 3 and grooves 4 which simulate the multiple wrinkles formed by the several sections of a larva.

Figure 1:
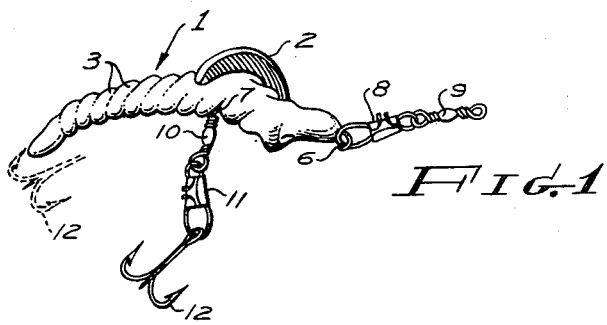
FIGURE 1 is a perspective view of the fishing lure indicating by dotted lines and fragmentarily, the position of the hook when the lure is being towed in the water.
Figure 2:
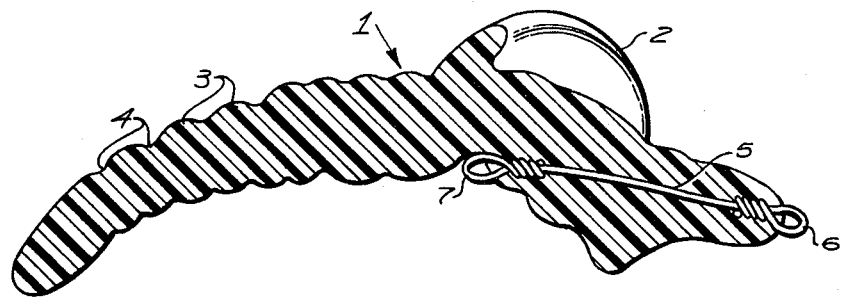
FIGURE 2 is an enlarged longitudinal sectional view of the fishing lure with the swivel connections to the fishing line and to the hooks removed.
Figure 3:
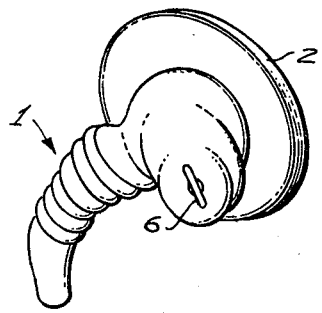
FIGURE 3 is an enlarged perspective front-end view of the fishing lure with the swivel connections removed.

Embedded in the body 1 is a wire 5 extending from a point under the fin 2 as viewed in FIGURES 1 and 2 and extending to the forward end of the body. At its forward end, the wire protrudes from the body and forms a forward loop 6. The rearward end of the wire protrudes from the underside of the body and forms a rearward loop 7.

The forward loop is connected by a forward link 8 and a forward swivel 9 to a fishing line, not shown. The rearward loop 7 is connected by a swivel 10 and link 11 to a multiple fish hook 12, preferably the type having three equally spaced hook elements.

The length of the assembly comprising the swivel 10, link 11 and fish hook 12 is such that when the lure is drawn through the water, the fish hook elements occupy a position contiguous to the rear-end of the body as indicated by dotted lines in FIGURE 1.

The body including the fin 2, is formed of a relatively light-weight plastic material which is impregnated with fluorescent coloring, so as to render the fishing lure conspicuous.

Operation of the fishing lure is as follows:

When the lure is drawn through the water, the helical fin 2 causes the body 1 to rotate, such rotation being permitted by the swivel 9. By reason of the fact that the body 1 is arcuate in form, the rotational movement is not confined to the axis of the helix. Instead, the curved body trailing from the helix produces rather eratically, lateral thrust in different directions as the body rotates and therefore, simulates movement of a live organism.

Also, as the lure moves through the water, the multiple hook 12 rotates with respect to the body by reason of the swivel 10, and tends to maintain a position near the tail end of the body, which is most apt to be struck by a fish.

While a particular embodiment of this invention has been shown and described, it is not intended to limit the same to the details of the construction set forth, but instead, the invention embraces such changes, modifications and equivalents of the various parts and their relationships as come within the purview of the appended claims.

We claim:
1. A fishing lure, comprising:
   (a) a generally arcuately shaped body;
   (b) a helical fin forwardly of the center of the body and occupying, in front aspect, a portion of a circle, and said body in front aspect curving into that portion of the circle unoccupied by said fin;
   (c) a loop element extending from the forward end of said body;
   (d) a swivel connected to said loop element to permit rotation of said body about a generally longitudinal axis;
   (e) a second loop disposed at the concave side of said body opposite from said helical fin;
   (f) a second swivel connected to said second loop;
   (g) a hook secured to said second swivel and movable along the concave side of the body into a position adjacent the tail-end of said body;
   (h) said fin tending, when said body is drawn through the water, to cause rotation of said body, and said body by reason of its longitudinal curvature and its trailing relation to said fin, tending to cause irregular movement of the lure in water.
2. A fishing lure, according to claim 1, wherein:
   (a) said body is provided with a series of wrinkle-simulating ribs.
3. A fishing lure, according to claim 1, wherein:
   (a) said second loop and the longitudinal center of said fin are located approximately one-third the distance from the forward end of the body.

4. A fishing lure, according to claim 1, wherein:
(a) said body is formed of plastic material impregnated with a fluorescent substance.

References Cited

UNITED STATES PATENTS

| | | | |
|---|---|---|---|
| 1,293,500 | 2/1919 | Mason | 43—42.46 |
| 1,359,618 | 11/1920 | Oliver et al. | 43—42.34 X |
| 2,443,124 | 6/1948 | Sullivan | 43—42.46 |
| 2,516,468 | 7/1950 | Klein | 43—42.48 X |
| 2,536,553 | 1/1951 | La Fleur | 43—42.48 |
| 2,573,215 | 10/1951 | Murphy | 43—42.46 |
| 2,691,839 | 10/1954 | Duerig | 43—17.6 |

SAMUEL KOREN, *Primary Examiner.*

D. J. LEACH, *Assistant Examiner.*